US009756684B2

(12) United States Patent
Tammisetti

(10) Patent No.: US 9,756,684 B2
(45) Date of Patent: Sep. 5, 2017

(54) SYSTEM AND METHOD FOR PROVIDING MULTI NETWORK CONNECTIVITY

(75) Inventor: Mohan Tammisetti, South Riding, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 705 days.

(21) Appl. No.: 13/029,221

(22) Filed: Feb. 17, 2011

(65) Prior Publication Data
US 2012/0213205 A1    Aug. 23, 2012

(51) Int. Cl.
*H04W 4/00* (2009.01)
*H04W 88/06* (2009.01)
*H04L 29/06* (2006.01)
*H04W 92/02* (2009.01)
*H04L 29/08* (2006.01)

(52) U.S. Cl.
CPC ............ *H04W 88/06* (2013.01); *H04L 69/18* (2013.01); *H04L 67/12* (2013.01); *H04W 92/02* (2013.01)

(58) Field of Classification Search
CPC ..... H04W 36/30; H04W 36/02; H04W 36/14; H04W 36/24; H04W 36/34; H04W 76/02; H04L 29/06
See application file for complete search history.

(56) References Cited

U.S. PATENT DOCUMENTS

| | | | |
|---|---|---|---|
| 6,915,128 B1 * | 7/2005 | Oh | 455/424 |
| 7,869,906 B2 * | 1/2011 | Louch et al. | 701/1 |
| 7,885,599 B2 * | 2/2011 | Yuhara et al. | 455/3.01 |
| 8,351,944 B2 * | 1/2013 | Lee | H04W 36/0016 455/435.1 |
| 8,606,292 B1 * | 12/2013 | Cope | H04W 48/04 455/238.1 |
| 8,965,695 B2 * | 2/2015 | Tzamaloukas | 701/537 |

(Continued)

OTHER PUBLICATIONS

Kondo, Taiji, et al., "Technology for WiFi/Bluetooth and WiMAX Coexistence", FUJITSU, Sci. Tech. J., vol. 46, No. 1, Jan. 2010, pp. 72-78.

(Continued)

*Primary Examiner* — Kibrom T Hailu

(57) ABSTRACT

In various embodiments, a system provides multi network connectivity between a broadband, packet-switched wireless Radio Access Network (RAN) and first and second different wireless networks using a broadband transceiver configured to receive and transmit packet-switched data over the RAN. First and second transceivers with respective data interfaces with the broadband transceiver are configured to establish a first and second wireless networks using different communications protocols. A processor and associated memory are operatively coupled together to at least control the broadband transceiver, the first transceiver, and the second transceiver. A communications range of the first and second wireless networks are extended beyond a respective intrinsic data communications capability thereof via the broadband transceiver. The system and method may be implemented to improve in-building wireless coverage, or to provide real-time content to mobile users, e.g., in an automobile, and/or to provide real-time vehicle diagnostic codes to a maintenance support node.

44 Claims, 4 Drawing Sheets

(56) References Cited

U.S. PATENT DOCUMENTS

Figure 1:
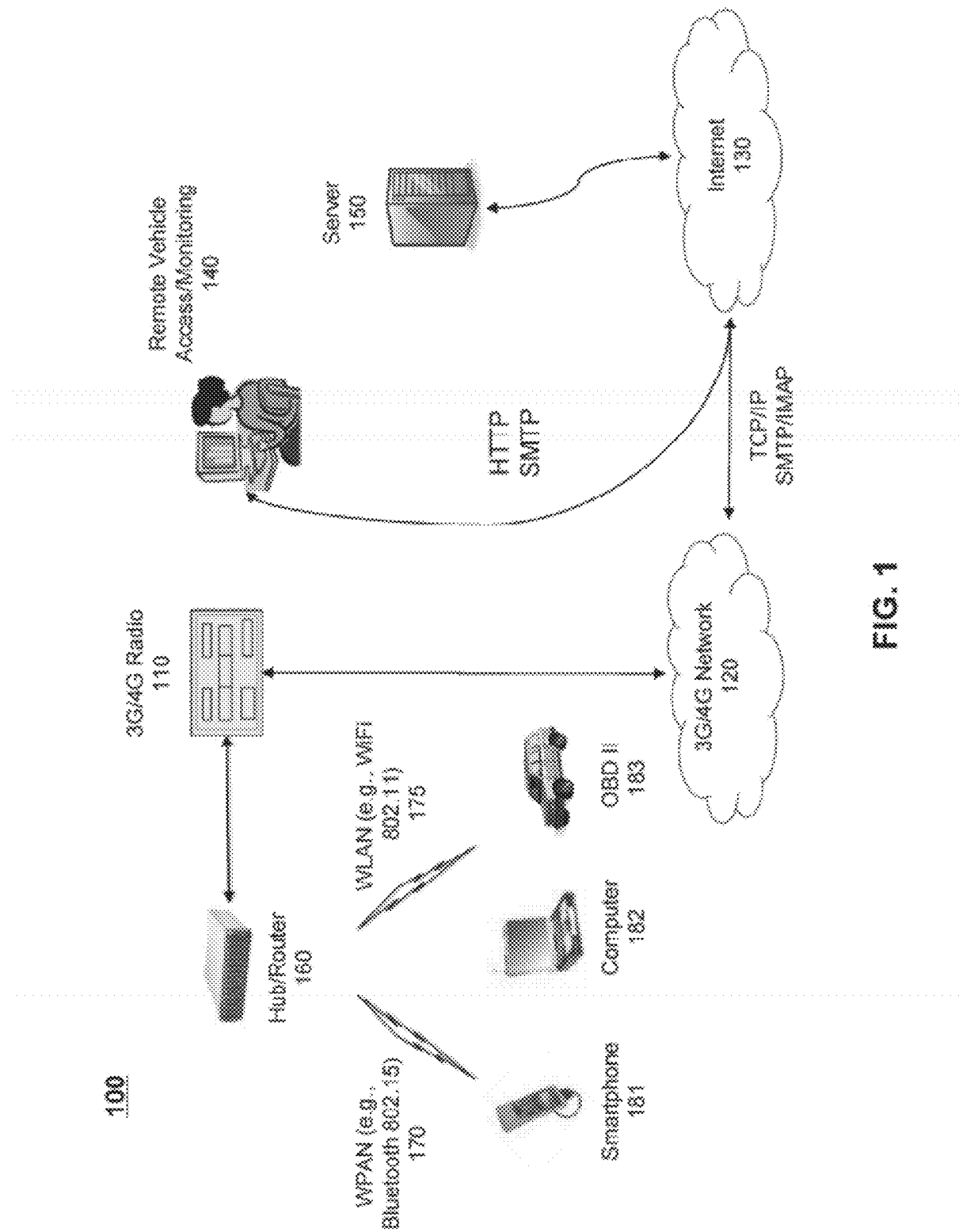

| | | | | |
|---|---|---|---|---|
| 2004/0113761 | A1* | 6/2004 | Borugian | 340/426.1 |
| 2004/0233045 | A1* | 11/2004 | Mays | B60K 35/00 |
| | | | | 340/425.5 |
| 2005/0168353 | A1* | 8/2005 | Dement | B60R 25/1025 |
| | | | | 340/995.1 |
| 2005/0198257 | A1* | 9/2005 | Gupta | G06F 1/3215 |
| | | | | 709/224 |
| 2006/0155437 | A1* | 7/2006 | Wang et al. | 701/29 |
| 2008/0154671 | A1* | 6/2008 | Delk | 705/7 |
| 2008/0167772 | A1* | 7/2008 | Du et al. | 701/33 |
| 2008/0192770 | A1* | 8/2008 | Burrows et al. | 370/466 |
| 2009/0004972 | A1 | 1/2009 | Wang et al. | |
| 2009/0005111 | A1 | 1/2009 | Wang et al. | |
| 2009/0102626 | A1* | 4/2009 | Lesesky | B60R 16/0315 |
| | | | | 340/431 |
| 2010/0088127 | A1* | 4/2010 | Betancourt | G06Q 10/02 |
| | | | | 705/5 |
| 2010/0131642 | A1* | 5/2010 | Chalikouras | G06Q 30/0241 |
| | | | | 709/224 |
| 2010/0157866 | A1* | 6/2010 | Sarikaya | H04W 52/0251 |
| | | | | 370/311 |
| 2011/0093306 | A1* | 4/2011 | Nielsen | G06Q 10/0631 |
| | | | | 705/7.13 |
| 2011/0095908 | A1* | 4/2011 | Nadeem | B60H 3/00 |
| | | | | 340/905 |
| 2011/0113219 | A1* | 5/2011 | Golshan | G06F 9/44505 |
| | | | | 712/30 |
| 2011/0191024 | A1* | 8/2011 | DeLuca | 701/216 |
| 2011/0195701 | A1* | 8/2011 | Cook et al. | 455/422.1 |
| 2011/0208953 | A1* | 8/2011 | Solomon et al. | 713/2 |
| 2011/0225096 | A1* | 9/2011 | Cho | G06Q 10/20 |
| | | | | 705/305 |
| 2011/0230165 | A1* | 9/2011 | Kleve | B60R 25/102 |
| | | | | 455/411 |
| 2012/0046807 | A1* | 2/2012 | Ruther | B60R 25/24 |
| | | | | 701/2 |

OTHER PUBLICATIONS

Bitran, Yigal, et al., "Solving the Coexistence of WiMAX, Bluetooth and WiFi in Converged Handsets", Jun. 18, 2007, 7 pages.
"Fractus Shows Fractal UWB Antenna", Fierce Broadband Wireless, Sep. 13, 2005, 1 page.

* cited by examiner

SYSTEM AND METHOD FOR PROVIDING MULTI NETWORK CONNECTIVITY

BACKGROUND

This disclosure is generally related to wireless communications technologies, including fourth generation (4G) Worldwide Interoperability for Microwave Access ("WiMAX") and/or Long-Term Evolution (LTE) technologies, as well as advanced third generation (3G) EvDO or High-Speed Downlink Packet Access (HSDPA) systems. In one or more embodiments, this disclosure is directed to a system and method useful for providing connectivity between a broadband, packet-switched Radio Access Network (RAN) such as WiMAX and/or LTE (or 3G EvDO or HSDPA) a to a personal area network (PAN) such as Bluetooth (IEEE 802.15) and/or to a wireless local area network (WLAN), e.g., a WiFi (IEEE 802.11) network.

International Mobile Telecommunications-Advanced (IMT Advanced), better known as "4G", "4th Generation", or "Beyond 3G", is the next technological strategy in the field of wireless communications. A 4G system may upgrade existing communication networks and is expected to provide a comprehensive and secure IP based solution where facilities such as voice, data and streamed multimedia will be provided to users on an "anytime, anywhere" basis, and at much higher data rates compared to previous generations. 4G devices provide higher speed and increased Quality of Service ("QoS") than their 3G counterpart devices.

One 4G technology is WiMAX, a wireless system that adheres to the IEEE 802.16-2009 Air Interface for Fixed and Mobile Broadband Wireless Access System. LTE is the project name of a high performance air interface for cellular mobile communication systems and is a step toward 4G radio technologies designed to increase the capacity and speed of mobile telephone networks. Where the current generation of mobile telecommunication networks are collectively known as 3G, LTE is marketed as 4G. Many major mobile carriers in the United States and several worldwide carriers announced plans to convert their networks to LTE beginning in 2009. LTE is a set of enhancements to the Universal Mobile Telecommunications System (UMTS) which is introduced in 3rd Generation Partnership Project (3GPP) Release 9, with further enhancements planned in Releases 10 and 11. These enhancements focus on adopting 4G mobile communications technology, including an all-IP flat networking architecture. Much of the LTE development work is aimed at simplifying the architecture of the LTE system, as it transits from the existing UMTS circuit-switched/packet switched combined network, to an all-IP flat architecture system.

WiMAX and LTE have many similar features. For example, WiMAX utilizes Channel Quality Indication (CQI), throughput, Carrier-to-Interference-Noise-Ratio (CINR), and Multiple Input, Multiple Output (MIMO) that are all present in LTE. Quality of Service (QoS) is also similar between WiMAX and LTE. LTE employs dedicated bearers similar to service flows in WiMAX. In both WiMAX and LTE, providing consistent high-quality service to end-users is difficult to provide in buildings, and in automobiles or other mobile platforms.

WiMAX and other 4G systems such as LTE present various signal propagation challenges. For example, the quality of the wireless channel is typically different for different users and different Quality of Service (QoS) requirements, and signal propagation randomly changes with time (on both slow and fast time scales). Further, wireless bandwidth is considered to be a scarce resource that needs to be used efficiently. In-building propagation can be problematic, and mobility such as provided by an automobile, further complicates signal transmission. For example, an automobile, aside from being mobile and requiring various base station hand-offs, is essentially a metal chamber that attenuates RF signals, thus making reception and desired quality-of-service difficult to achieve.

In contrast, wireless networks such as Bluetooth (or other personal area networks) and WiFi provide shorter range and generally lower data rates. These interfaces are commonly available to a variety of mobile phones, Personal Data Assistants (PDA), personal computers, of either the desktop, laptop, or tablet/notebook type. As these systems have evolved, data rates have increased.

Bluetooth is an open wireless technology standard for exchanging data over short distances (using short length radio waves) from fixed and mobile devices, creating personal area networks (PANs) under the IEEE 802.15 standard with high levels of security. Bluetooth can connect several devices, overcoming problems of synchronization. Bluetooth uses a radio technology called frequency-hopping spread spectrum, which chops up the data being sent and transmits portions of data on up to 79 bands of 1 MHz width in the range 2402-2480 MHz. This is in the unlicensed Industrial, Scientific and Medical (ISM) 2.4 GHz short-range radio frequency band in the United States, for example.

Bluetooth provides a secure way to connect and exchange information between devices such as faxes, mobile phones, telephones, laptops, personal computers, printers, Global Positioning System (GPS) receivers, digital cameras, and video game consoles. The Bluetooth specifications are developed and licensed by the Bluetooth Special Interest Group (SIG). The Bluetooth SIG consists of more than 13,000 companies in the areas of telecommunication, computing, networking, and consumer electronics. Bluetooth is a standard communications protocol primarily designed for low power consumption, with a short range (power-class-dependent: 100 m, 10 m and 1 m, but ranges vary in practice.

Wi-Fi® is a trademark of the Wi-Fi Alliance that manufacturers may use to brand certified products that belong to a class of wireless local area network (WLAN) devices based on the IEEE 802.11 standards, which today is the most widespread WLAN. Because of the close relationship with its underlying standards, the term Wi-Fi is often used as a synonym for IEEE 802.11 technology. The Wi-Fi Alliance, a global association of companies, promotes WLAN technology and certifies products if they conform to certain standards of interoperability. IEEE 802.11 devices are installed in many personal computers, video game consoles, smartphones, printers, and other peripherals, and virtually all laptop computers.

A Wi-Fi enabled device such as a personal computer, video game console, mobile phone, MP3 player or personal digital assistant can connect to the Internet when within range of a wireless network connected to the Internet. The coverage of one or more (interconnected) access points—called hotspots—can comprise an area as small as a few rooms or as large as many square miles. Coverage in the larger area may depend on a group of access points with overlapping coverage.

Routers that incorporate a digital subscriber line (DSL) modem or a cable modem and a Wi-Fi access point, often set up in homes and other premises, can provide Internet access and internetworking to devices wirelessly connected to them. One can also connect Wi-Fi devices in ad-hoc mode for client-to-client connections without a router. Wi-Fi also connects places that would traditionally not have network access, and also allows communications directly from one computer to another without the involvement of an access point. This is called the ad-hoc mode of Wi-Fi transmission that has proven popular with various consumer electronics devices.

While Bluetooth and Wi-Fi networks offer various benefits for stationary networks in a home or office environment, such as when a larger bandwidth signal such as a WiMAX 4G network has difficulty penetrating building walls. However, these relatively short-range WPAN and WLAN network solutions are generally unsuitable for mobile platforms, particularly in automobiles and/or aircraft or other metal enclosures, either mobile or stationary. Further, earlier implementations of Bluetooth and Wi-Fi networks support data rates that are generally much lower than those required for various content-rich data, e.g., video, gaming, real-time applications, or other on-demand content. However, these data rates are improving as newer versions are implemented.

Many wireless phone users remain frustrated by poor service quality and poor reception, particularly mobile users inside an automobile, and particularly for newer packet switched networks such as 4G WiMAX or LTE. Cars often need external antenna and signal amplification to enhance 4G signals.

In addition, as automobile technology advances, many automobiles utilize one or more internally wired networks for carrying out various automotive control and monitoring functions. As automobiles become more complex and the degree of system integration increases, an increasing amount of digital automotive diagnostic data is available for monitoring and troubleshooting vehicle performance. However, to date, this diagnostic information is generally only available to a technician that is physically present with the vehicle, and who has specialized read out electronics that physically connect to the vehicle.

What is needed is a system and method of wireless communications that improves connectivity for end users in buildings or mobile platforms, particularly for users in mobile vehicles, and which is relatively simple to implement. What is even further needed is a system and method for wireless communications that allows sharing of a relatively high data rate backhaul network that provides "real-time" content to devices operating at lower data rates. What is also needed is a system and method for providing wireless access to vehicle diagnostic information.

SUMMARY

The apparatus, system, and method of this disclosure provide various features, functions, and capabilities as discussed more fully in the detailed description. Various embodiments of this disclosure are useful in providing improved in-building wireless coverage, while other aspects of this disclosure are useful in providing real-time and/or on-demand content to mobile users with high bandwidth. Other aspects of this disclosure are useful in providing diagnostic information regarding a vehicle in a real-time manner to a maintenance support facility.

In one embodiment, a system for providing connectivity between a broadband, packet-switched wireless Radio Access Network (RAN) and first and second different wireless networks includes a broadband transceiver configured to receive and transmit packet-switched data over the RAN; a first transceiver having a first data interface with the broadband transceiver and configured to establish a first wireless network using a first communications protocol; a second transceiver having a second data interface with the broadband transceiver and configured to establish a second wireless network using a second communications protocol different from the first communications protocol; and a processor and associated memory operatively coupled together to at least control the broadband transceiver, the first transceiver, and the second transceiver, wherein an effective communications range of both the first wireless network and the second wireless network are extended beyond a respective intrinsic data communications capability thereof via the broadband transceiver.

In other aspects of an embodiment, the system is arranged in a mobile vehicle, and the system further includes a wireless data interface over one of the first and second wireless networks. The wireless data interface establishes at least one wireless connection within the mobile vehicle with one or more users occupying the mobile vehicle. An Internet connection established by an external server accessible by the RAN is provided to one or more users within the mobile vehicle via one of the wireless connections in the vehicle.

In other aspects of an embodiment, a Global Positioning System (GPS) interface may be configured to provide vehicle location information to the data server via the RAN. Localized service information may be received by the broadband receiver from the data server based upon the vehicle location information.

In other aspects of an embodiment in a vehicle, an onboard vehicle diagnostic system is configured to provide vehicle error codes to a data server via the RAN. Further, the system may receive vehicle maintenance information from the data server based at least upon the vehicle error codes provided to the data server. In another aspect, the vehicle maintenance information comprises at least a nearest maintenance location for the vehicle based upon the GPS location of the vehicle.

In another embodiment, a method of providing connectivity between a broadband, packet-switched wireless Radio Access Network (RAN) and first and second different wireless networks includes providing a broadband transceiver configured to receive and transmit packet-switched data over the RAN; a first transceiver having a first data interface with the broadband transceiver and configured to establish a first wireless network using a first communications protocol; a second transceiver having a second data interface with the broadband transceiver and configured to establish a second wireless network using a second communications protocol different from the first communications protocol; and a processor and associated memory operatively coupled together to at least control the broadband transceiver, the first transceiver, and the second transceiver, wherein an effective communications range of both the first wireless network and the second wireless network are extended beyond a respective intrinsic data communications capability thereof via the broadband transceiver.

In an aspect of an embodiment, real-time data services are provided via a server connected to the RAN, and the real-time data services are retransmitted via the first wireless network in a moving vehicle.

In another aspect of an embodiment, vehicle diagnostic information is provided via the second wireless network to a support node coupled to the RAN. A current GPS location may be provided along with the vehicle diagnostic information. Based upon the current GPS vehicle location, directions to a vehicle maintenance facility may be received from the support node.

BRIEF DISCUSSION OF THE DRAWINGS

Figure 2:
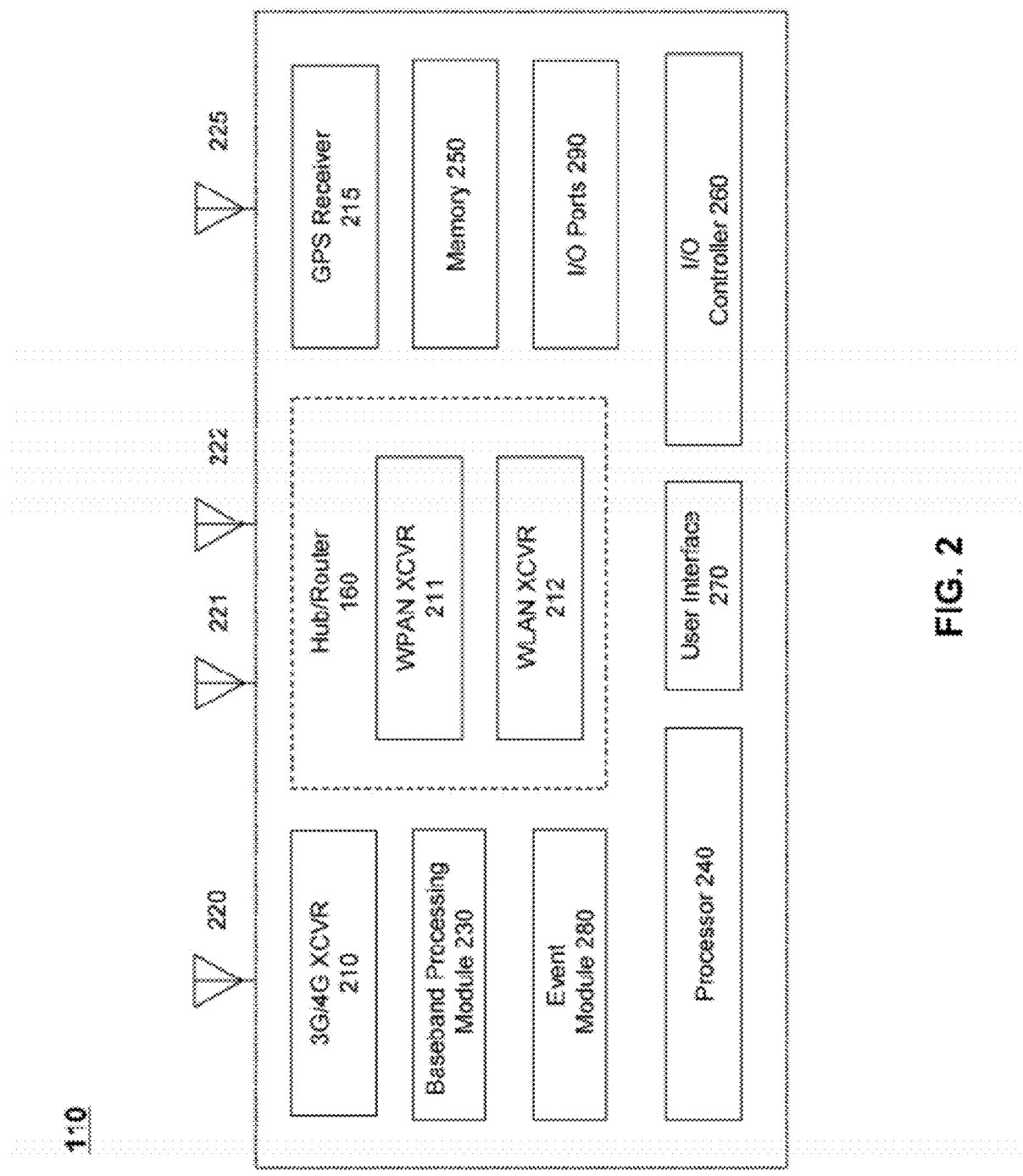
Figure 3:
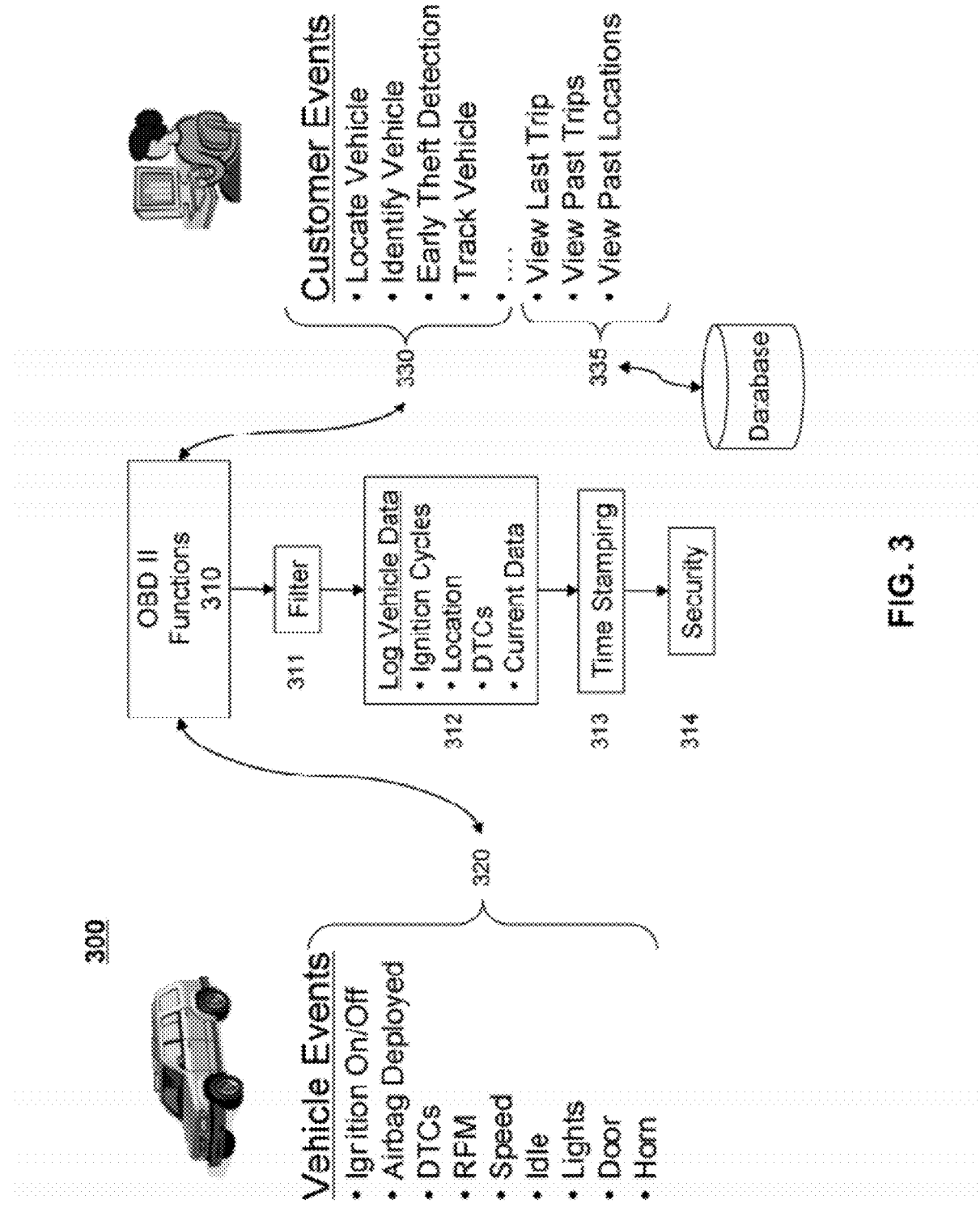
Figure 4:
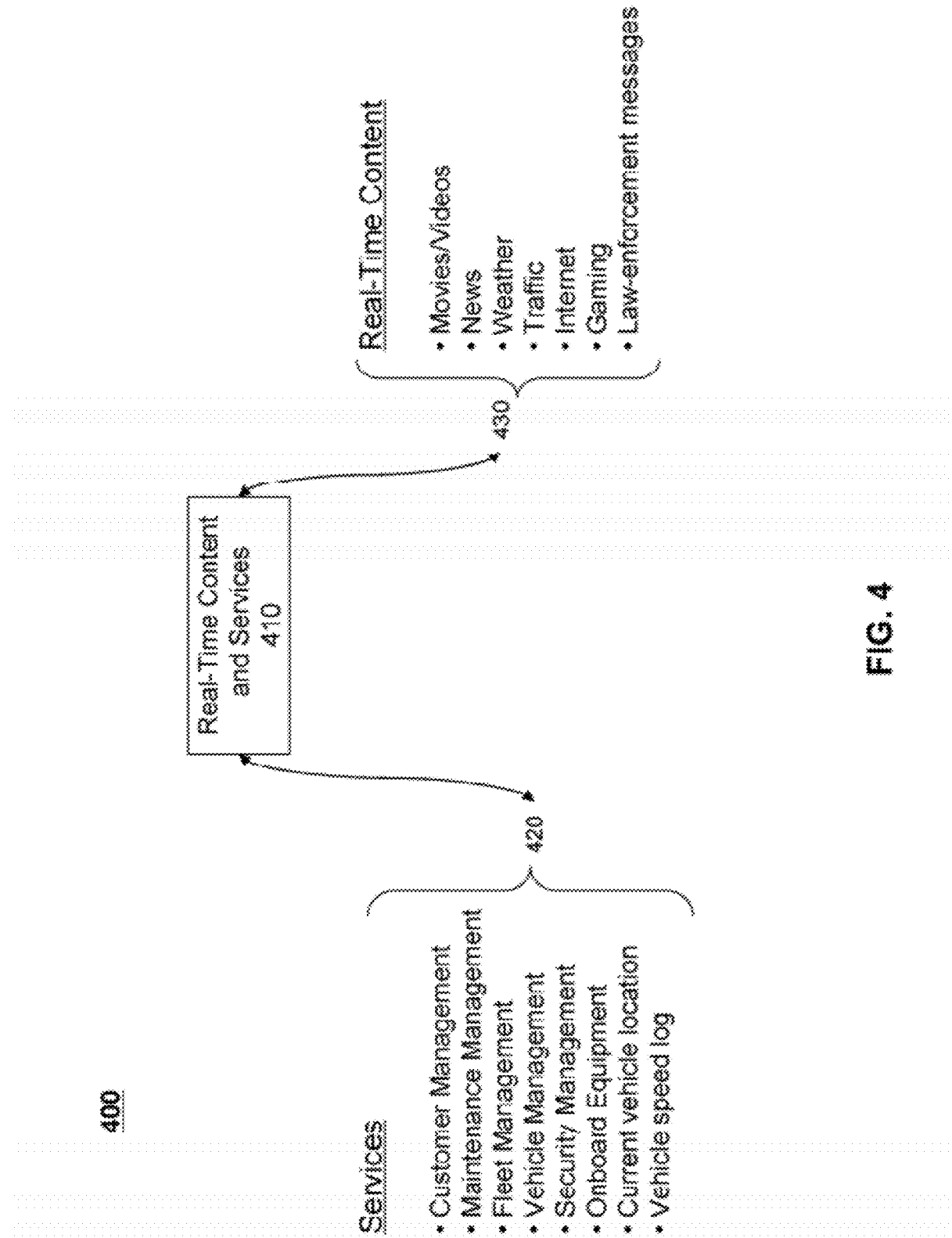

FIG. 1 illustrates an exemplary embodiment of a system that includes a 3G/4G radio;

FIG. 2 provides a functional block diagram of an exemplary 3G/4G radio of FIG. 1;

FIG. 3 illustrates several vehicle and customer events or functions that may be monitored and/or logged by an onboard vehicle diagnostic module(s) in an embodiment; and FIG. 4 depicts various examples of services and real-time content that may be provided to an end user by one or more aspects of the system of FIG. 1.

DETAILED DESCRIPTION

In the discussion of various embodiments and aspects of the system and method of this disclosure, examples of a processor may include any one or more of, for instance, a personal computer, portable computer, personal digital assistant (PDA), workstation, web-enabled mobile phone, WAP device, web-to-voice device, or other device. Further, examples of mobile devices may include wireless phone handsets, smart phones, modems, laptop or tablet computers with embedded dual-mode functionality, gaming consoles, and mobile Internet devices such as used for video streaming, for example, including 4 G (WiMAX or LTE) mobile devices, dual-mode 3G CDMA/4G mobile devices, 3G EvDO devices, or 3G HSDPA devices.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a non-transitory form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

In FIG. 1, an exemplary embodiment of system 100 for providing multi-network connectivity is illustrated. Radio 110 may be an advanced packet-switched 3G radio, e.g., EvDO or HSDPA, a 4G radio, e.g., WiMAX or LTE, or a dual-mode 3G/4G device. Radio 110 wirelessly connects to 3G/4G network 120, which may be a corresponding conventional wireless packet switched radio access network (RAN) used for cellular communications, e.g., 3G EvDO/HSDPA or 4G WiMAX/LTE. Using conventional backhaul, 3G/4G network 120 connects to Internet 130, remote vehicle access/monitoring node 140, and server 150, discussed below.

Radio 110, which may be in a building or mobile vehicle, e.g., an automobile, is communicatively coupled to hub/router 160. Hub/router 160 receives packet-switched data from radio 110, and retransmits selected 3G/4G data via at least first and second network connections 170 and 175 which may be, respectively, a wireless personal area network (WPAN) such as Bluetooth (IEEE 802.15 standard) or Zigbee, for example, and a wireless local area network (WLAN) such as a WiFi network (IEEE 802.11 standard).

First and second network connections 170 and 175 may interface with a wide variety of electronic devices and systems. For example, smartphone 181 may connect to hub/router 160 via Bluetooth or wireless local area network (WLAN), e.g., WiFi, while computer 182, e.g., a laptop or tablet computer, may connect to hub/router 160 via WiFi. In the case of an automobile or other mobile platform, vehicle onboard diagnostics (OBD) functions may interface with in-car hub/router 160 via WPAN 170, e.g., a Bluetooth PAN. For example, most, if not all modern automobiles utilize industry-standard OBD II vehicle diagnostics, which provide a standard set of diagnostic codes used by technicians to perform maintenance or automotive performance assessment. Specialized readers that plug into a wire harness, for example, conventionally read these diagnostic codes. However, in an embodiment illustrated by FIG. 1, OBD II diagnostics 183 may be read and wirelessly transmitted over WPAN 170 to hub/router 160, and then over 3G/4G radio 110 to remote vehicle access monitoring node 140 via 3G/4G network 120, and Internet 130. Alternatively, OBD II diagnostics 183 may be "hardwired" to hub/router 160.

A functional block diagram of radio 110 is provided in FIG. 2. Transceiver 210 is an appropriate 3G or 4G transceiver that depends on the type of wireless network 120 that is connected, e.g., either a 3G EvDO or an HSDPA network; or a 4G WiMAX or LTE network. Alternatively, transceiver 210 may be a dual or multimode transceiver that works in either a 3G or 4G mode depending on network availability and coverage. Antenna 220 is utilized by 3G/4G transceiver 210 for two-way communications. In the case of a metallic vehicle, antenna 220 may be a fractal antenna that mounts on a glass window of the vehicle. An example of a fractal antenna is one manufactured by Fractal Antenna Systems, Inc. of Bedford, Mass.

Hub/router 160 may be integrated with 3G/4G transceiver 210, or hub/router 160 may be a standalone unit. In one embodiment, 3G/4G transceiver 210 may be implemented as a WiMAX or LTE USB-based laptop card that connects to hub/router 160. Similarly, other advanced 3G systems such as EvDO and HSDPA may be implemented as a laptop card. One function of hub/router 160 is to convert 3G/4G network messages to/from WPAN 170 and WLAN 175 message protocols. Antennae 221 and 222 are associated with WPAN 170 and WLAN 175, respectively, through WPAN transceiver 211 and WLAN transceiver 212.

In addition, for the case of a moving vehicle such as an automobile, GPS receiver 215 may be used to provide vehicle location information that can be useful in a variety of ways, as discussed below. As mentioned above, system 100 may also be used as a stationary system to improve in-building coverage by making high bandwidth/data rate 4G backhaul available to Bluetooth or WiFi connected devices inside a building that otherwise would have inadequate coverage.

Baseband processing module 230 is used to process the information/data received from and sent to 3G/4G transceiver 210, and to further interface with hub/router 160. Processor 240 is used to carry out various computer-processing functions of 3G/4G radio 110, and may be implemented as multiple processors executing computer instructions provided as software and/or firmware instructions stored in memory 250, which may be of any appropriate conventional non-transitory storage medium. Input/output controller 260 is utilized to control the various functions of 3G/4G radio 110, the timing requirements of various modules, as well as output ports 290, which may include Ethernet, universal serial bus (USB), or a serial bus (e.g., RS232) interfaces/ports.

User interface 270 may provide multiple ways for an end user of system 100 to interface, i.e., control or use, the various functions provided. User interface 270 may include a visual display, touch screen, mouse, keyboard, and/or audio warning device, as is conventionally known to allow the user to set parameters, view messages, control hub/router 160, and/or control access to 3G/4G wireless network 120.

In the case where system 100 is implemented in a vehicle, e.g., an automobile, event module 280 may be used to process various OBD II vehicle diagnostic test codes (DTCs) sent to hub/router 160 via WPAN 170, for example. Such codes indicate the state of the vehicle with respect to performance and/or maintenance issues. Alternatively, as mentioned above, OBD II DTCs may be provided to hub/router 160 in a "hardwired" manner when the auto manufacturer integrates system 100 into a new vehicle. System 100 may also be provided in an "after market" package, which is installed in an automobile after its original consumer sale. Such after market installation may be provided in conjunction with a specific maintenance facility, a group of maintenance facilities (e.g., multiple auto repair facilities) or in cooperation with one or more car manufacturers.

In addition to OBD II diagnostic trouble codes (DTC) that are read either via hardwired or wireless connection, other codes representing vehicle events as shown in FIG. 3 may be processed by event module 280 for storage in a memory, and/or forwarding to remote vehicle access/monitoring node 140. Such vehicle events may include, but are not limited to signals that represent Ignition On/Off, airbag deployment, engine RPM, vehicle speed, excessive engine idle, lights "on" or "off", door "locked" or "unlocked", or horn activation. Such events may be reported as they occur or on a periodic basis as scheduled by I/O controller 260, or remote vehicle access/monitoring node 140 may periodically poll system 100.

Filter 311 may be programmed to log and/or forward specific vehicle data 312, such as vehicle ignition cycles, vehicle location (in conjunction with GPS receiver 215), specific DTCs, and other current vehicle data. Such data may be time stamped, and appropriate security/encryption may be implemented for any data that is transmitted wirelessly within or without the vehicle to ensure that any private or sensitive information is not compromised.

Customer events 330 may also be handled by event module 280 in cooperation with processor 240 and memory 250. Such customer events or requests may include vehicle location, vehicle identification (in the case of a stolen automobile), early theft detection, and vehicle tracking Vehicle trip information 335 may also be processed by event module 280 to allow viewing of details regarding a last trip, past trips, and/or past vehicle locations using GPS location information.

FIG. 4 illustrates a variety of exemplary real-time content and on-demand services 410 that may be provided by system 100, e.g., via server 150, or via remote vehicle access/monitoring node 140. On-demand services 420 may include, for example, customer management services, maintenance management services, vehicle management including fleet management, vehicle security management, management of onboard equipment, current vehicle location, and a vehicle speed log.

Real-time content 430 received from server 150 may include, for example, streaming movies or videos, gaming, news/weather/traffic, Internet access, and law-enforcement messages, e.g., emergencies, natural disasters, or "Amber Alerts" for missing children, etc.

One result of the system described above is that an effective communications range of both the first wireless network and the second wireless network are extended beyond their respective intrinsic data communications capabilities by interfacing the relatively short-range WPAN and WLAN networks within a vehicle (or in-building) with the broadband transceiver which makes the high data rates of a high speed advanced 3G or 4G system available to WiFi and Bluetooth devices located inside a vehicle, up to their respective data rate limits.

Further, when a Global Positioning System (GPS) interface is used to provide mobile vehicle location information via the RAN to the data server, the broadband receiver may receive localized service information from the data server based upon the vehicle location information. Such localized service information can include weather or traffic-related information, or the localized service information can include vehicle maintenance-related information. A relative priority may be assigned by processor 240 to the localized service information based upon the type of information being provided, e.g., hazardous weather, natural disaster, etc.

When radio 110 is a dual 3G/4G mode radio, user interface 270 may be configured to allow processor 240 to automatically initiate a handover of the RAN from a 4G network to a 3G network, or from a 3G network to a 4G network in response to one or more conventional RAN quality indicators.

While various embodiments of system 100 are useful to provide vehicle diagnostic information, wireless connections may be established within the mobile vehicle with one or more users occupying the mobile vehicle, including an Internet connection that can be maintained for users within the mobile vehicle while the vehicle is moving, and which requires that one or more base station handoffs be made in connection with maintaining connectivity of the RAN. The Internet connection may include a streaming broadband data flow comprising either video, or audio, or both to the one or more users within the mobile vehicle, the broadband data flow may include real-time content.

In one or more embodiments, remote vehicle access/monitoring node 140 may provide services in connection with one or more of a vehicle location request, a vehicle theft report, an engine kill request, a vehicle tracking request, a vehicle trip log request, and a time-based listing of past vehicle locations. In addition, real-time fleet vehicle location services and fleet vehicle management services may be provided wirelessly to a vehicle fleet manager via an external Internet connection to the external server, e.g., track where vehicles are currently located.

As mentioned, in one embodiment, the RAN is a WiMax network, the first wireless network is a WiFi network, and the second wireless network is a Bluetooth network in which the WiFi and Bluetooth networks provide network coverage within the automobile for one or more users, and the WiMax network provides a backhaul capability. Vehicle diagnostic information may be "hardwired" into hub/router 160, or may be provided via a Bluetooth interface.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A system for providing connectivity between a broadband, packet-switched wireless Radio Access Network (RAN) and first and second different wireless networks, the system comprising:
    a broadband transceiver configured to receive and transmit packet-switched data over the RAN;
    a hub module within a vehicle comprising:
    a first transceiver having a first data interface with the broadband transceiver and configured to establish a first wireless network using a first communications protocol,
    wherein the hub module is configured at least to convert the packet-switched data to and from data according to the first communications protocol; and
    a vehicle diagnostic system within the vehicle configured to wirelessly provide vehicle diagnostic information to the first transceiver using the first communications protocol via a wireless data interface between the first transceiver and the vehicle diagnostic system, the vehicle diagnostic information is transmitted over the first network and the RAN, via the broadband transceiver, to a data server,
    wherein the broadband transceiver is configured to receive service information and related priority information from the data server, the priority information determining a type of data connection provided to the broadband transceiver over the RAN.

2. The system of claim 1, wherein the broadband transceiver is a 4G transceiver.

3. The system of claim 2, wherein the 4G transceiver is a WiMax transceiver.

4. The system of claim 2, wherein the 4G transceiver is an LTE transceiver.

5. The system of claim 1, wherein the broadband transceiver is a 3G transceiver.

6. The system of claim 5, wherein the 3G transceiver is an EvDO transceiver.

7. The system of claim 5, wherein the 3G transceiver is an HSDPA transceiver.

8. The system of claim 1, wherein the hub module further includes a second transceiver having a second data interface with the broadband transceiver and configured to establish a second wireless network using a second communications protocol different from the first communications protocol,
    wherein one of the first and second wireless networks is a WiFi network and the other one of the first and second wireless networks is a Bluetooth network.

9. The system of claim 1, wherein the system is arranged in a mobile vehicle, the system further comprising:
    the wireless data interface over the first wireless network with the vehicle diagnostic system of the mobile vehicle.

10. The system of claim 1, further comprising a Global Positioning System (GPS) interface configured to provide vehicle location information to a data server via the RAN.

11. The system of claim 10, wherein localized service information is received by the broadband receiver from the data server based upon the vehicle location information.

12. The system of claim 11, wherein the localized service information comprises weather-related information.

13. The system of claim 11, wherein the localized service information comprises traffic-related information.

14. The system of claim 11, wherein the localized service information comprises vehicle maintenance-related information.

15. The system of claim 11, wherein the localized service information comprises law enforcement-related information.

16. The system of claim 1, wherein the priority information is assigned to the service information based upon a type of the service information.

17. The system of claim 1, wherein the vehicle diagnostic information includes vehicle error codes.

18. The system of claim 17, wherein the onboard vehicle diagnostic system is configured to automatically provide event-based vehicle error codes to the data server via the RAN.

19. The system of claim 17, wherein the broadband transceiver receives vehicle maintenance information from the data server based at least upon the vehicle error codes provided to the data server.

20. The system of claim 19, wherein the vehicle maintenance information comprises at least a nearest maintenance location for the vehicle.

21. The system of claim 1, wherein the vehicle diagnostic system is configured to accept a polling request received from a data server via the RAN and, responsive to the polling request, the vehicle diagnostic system is configured to provide vehicle error codes to the data server via the RAN.

22. The system of claim 1, further comprising a personal area network (PAN) transceiver connected to the vehicle diagnostic system.

23. The system of claim 22, wherein the PAN comprises a Bluetooth network.

24. The system of claim 1, further comprising a user interface configured to at least facilitate selection of one of a plurality of operational modes of the system.

25. The system of claim 24, wherein the user interface comprises a touch screen interface.

26. The system of claim 24, wherein the plurality of operational modes comprises the RAN being either a 4G or 3G network.

27. The system of claim 26, wherein the user interface is configured to allow a processor to automatically initiate a handover of the RAN from a 4G network to a 3G network, or from a 3G network to a 4G network in response to one or more RAN quality indicators.

28. The system of claim 1, wherein the broadband transceiver, the first transceiver, and the vehicle diagnostic system are arranged in a single enclosure suitable for installation in an automobile.

29. The system of claim 1, further comprising a wideband fractal antenna arranged on a window of the vehicle and operatively connected at least to the broadband transceiver.

30. The system of claim 1, wherein the system is arranged in a mobile vehicle,
    wherein the hub module further includes a second transceiver having a second data interface with the broadband transceiver and configured to establish a second wireless network using a second communications protocol different from the first communications protocol, said second wireless data interface establishing at least one wireless connection within the mobile vehicle with one or more users occupying the mobile vehicle, wherein an Internet connection established by an external Internet-based server accessible by the RAN is provided to said one or more users within the mobile vehicle via the at least one wireless connection.

31. The system of claim 30, wherein the Internet connection is maintained for said one or more users within the mobile vehicle while said broadband transceiver executes one or more base station handoffs in connection with maintaining connectivity of the RAN.

32. The system of claim 30, wherein the Internet connection comprises a streaming broadband data flow comprising either video, or audio, or both to the one or more users within the mobile vehicle.

33. The system of claim 32, wherein the broadband data flow comprises real-time content.

34. The system of claim 30, further comprising a wireless data connection to the external Internet-based server via the broadband transceiver and the RAN, wherein the Internet connection is made via the external Internet-based server.

35. The system of claim 30, wherein the mobile vehicle comprises an automobile.

36. The system of claim 1, wherein the vehicle diagnostic information comprises vehicle event-driven diagnostic information resulting from one or more vehicle events selected from the group consisting of: an ignition on/off state, an airbag deployment, a vehicle speed indication, an excessive vehicle RPM indication, and an engine problem indication.

37. The system of claim 1, wherein the vehicle diagnostic information comprises vehicle owner-related information selected from the group consisting of: a vehicle location request, a vehicle theft report, an engine kill request, a vehicle tracking request, a vehicle trip log request, and a time-based listing of past vehicle locations.

38. The system of claim 30, wherein the wireless data connection to the external server provides real-time fleet vehicle location services and fleet vehicle management services to a vehicle fleet manager via an external Internet connection to the external server.

39. The system of claim 30, wherein the wireless data connection to the external server provides remote management of on board automobile diagnostics, automobile location-based services, and real-time on-demand video and/or audio content via the RAN and one of the first and second wireless networks.

40. The system of claim 8, wherein the RAN is a WiMax network, the first wireless network is a WiFi network, and the second wireless network is a Bluetooth network, wherein the WiFi and Bluetooth networks provide network coverage within the automobile for one or more users thereof, and the WiMax network provides a backhaul capability at least to the Internet.

41. A method of providing connectivity between a broadband, packet-switched wireless Radio Access Network (RAN) and a first wireless network, the method comprising:

providing a broadband transceiver configured to receive and transmit packet-switched data over the RAN;

providing a first data interface to facilitate communication between a first transceiver and the broadband transceiver, wherein the first transceiver is configured to establish a first wireless network using a first communications protocol, wherein a hub module within a vehicle comprising the first transceiver is configured to at least convert the packet-switched data to and from data according to the first communications protocol wirelessly providing, within the vehicle, vehicle diagnostic information from a vehicle diagnostic system within the vehicle to the first transceiver using the first communications protocol via a wireless data interface between the first transceiver and the vehicle diagnostic system;

transmitting the vehicle diagnostic information over the first network and the RAN, via the broadband transceiver, to a data server; and receiving, at the broadband transceiver, service information and related priority information from the data server, the priority information determining a type of data connection provided to the broadband transceiver over the RAN.

42. The method of claim 41, further comprising providing, via a server connected to the RAN, real-time data services and retransmitting said real-time data services via the first wireless network in a moving vehicle.

43. The method of claim 41, further comprising providing a current GPS location along with the vehicle diagnostic information.

44. The method of claim 41, further comprising receiving, directions to a vehicle maintenance facility from a support node.

* * * * *